March 10, 1964 W. J. BARTIK 3,124,787

FERRITE CORE STORAGE DEVICE

Filed Sept. 1, 1960

*INVENTOR.*
WILLIAM J. BARTIK

Charles C. English
AGENT 3,124,787

FERRITE CORE STORAGE DEVICE

William J. Bartik, Hatboro, Pa., assignor to Sperry Rand Corporation, New York, N.Y., a corporation of Delaware Filed Sept. 1, 1960, Ser. No. 53,417
8 Claims. (Cl. 340—174)

The present invention relates to an improvement in magnetic devices employing ferrites. More particularly the invention relates to magnetic storage devices employing ferrite cores. It has been discovered that an improvement in operating characteristics and performance may be obtained from magnetic devices employing ferrites by raising the temperature of such ferrites to a value substantially above normal atmospheric temperatures, i.e. room temperature circa 70° F.

It is, accordingly, an object of the invention to provide an improved ferrite core storage device.

It is a further objective of the invention to provide a magnetic storage device employing ferrites in which the temperature is maintained at a substantially constant value above normal atmospheric temperatures.

Still another object of the invention is the obtaining of a decreased drive current requirement for ferrite storage cores while maintaining a usable signal to noise output ratio.

A still further object of the invention is to provide a core type matrix storage array using ferrite cores in which the temperature of the ferrites is maintained substantially higher than normal atmospheric temperature.

In accomplishing the foregoing objectives there is provided a ferrite core storage matrix or a plurality of such matrices, a cabinet which may be thermally insulated surrounding such matrices, a heating means within the aforesaid cabinet and a thermostatic control adapted to regulate the output of the heating means in order to maintain the temperature within the cabinet at a substantially constant predetermined level above that of the ambient atmosphere surrounding the cabinet.

Figure 1:
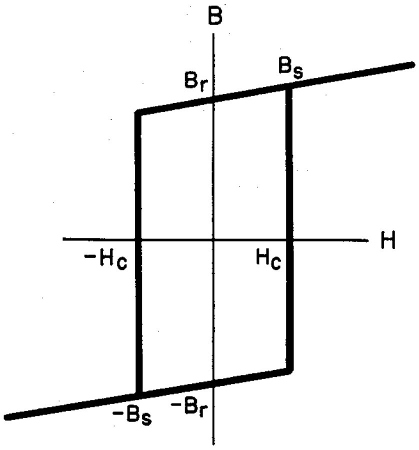
Figure 2:
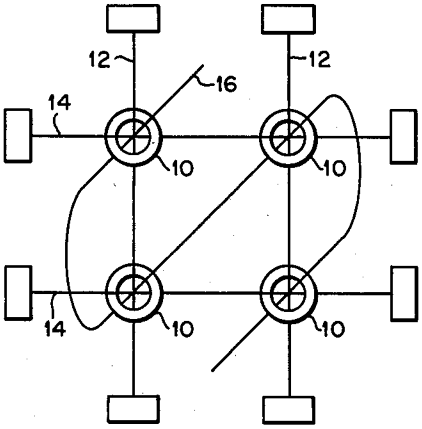
Figure 3:
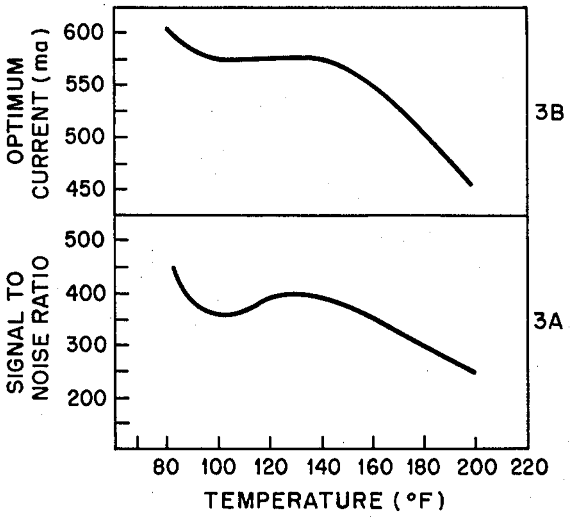
Figure 4:
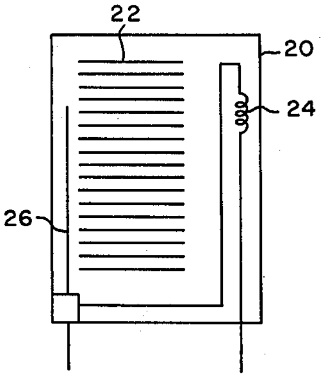

In the drawings, FIGURE 1 is a diagrammatic representation of a hysteresis loop typical of that common to the ferrites contemplated for the present invention;

FIGURE 2 is a schematic circuit diagram of a storage matrix employing ferrite storage cores;

FIGURES 3*a* and 3*b* are graphical representations showing typical performance curves obtained at various temperatures for ferrite cores of the type employed in the invention, and FIGURE 4 shows one typical arrangement of elements for accomplishing the objectives of the invention.

FIGURE 1 shows a typical hysteresis loop of rectangular form such as may apply to the ferrite cores of the invention. From a consideration of such a hysteresis loop it is apparent that with a magnetic core assumed to be initially at the negative remanence point $-B_r$, the application of sufficient magnetic field H to drive the material beyond the knee of the loop, will drive it up the vertical portion and to a condition of positive saturation $B_s$. After the magnetic field H has been removed the flux $B_s$ will drop back to a point $B_r$ representative of positive remanence. Upon application of a negative magnetic field $-H$ the magnetic element will be caused to traverse its hysteresis loop back to the point $-B_s$ and upon removal of the aforesaid negative magnetic field will reside once more at $-B_r$. From a consideration of such a hysteresis loop it will be seen that the magnetic element may exist in two stable states of magnetization represented respectively by $B_r$ and $-B_r$. Use may be made of this phenomenon in magnetic storage devices.

A typical storage device is shown by FIGURE 2. In FIGURE 2 reference numeral 10 indicates each of a plurality of ferrite cores. While only four such cores have been shown, it is apparent that many more could be provided and in one form actually found to be practical a matrix of cores was used comprising 2500 such cores. Vertical lines 12 represent switching lines to which current may be applied. Such current when applied would be effective to apply a magnetic field $H/2$ which is equal to half the field H required to bring about switching of the cores associated with the given line from one remanent point on their hysteresis loops to the other remanent point. Also associated with the cores will be horizontal switching lines 14. These also may have applied thereto sufficient current to apply half the magnetic field H required to effect the switching of the cores associated with the respective lines. It is apparent from a consideration of the aforesaid matrix that when switching currents are applied simultaneously to a preselected horizontal and a preselected vertical switching line that the core at the intersection of such switching lines will receive a magnetic field equal to H which is the field required to effect switching of such selected core from one remanent point to the other.

Also associated with the matrix of cores is a line 16 which may be used to read information stored in selected cores. If it be assumed that a given core resides at its negative remanent point $-B_r$ and that such core is selected by being simultaneously pulsed by currents applied to the switching lines 12 and 14 coincident therewith, then as the core is caused to traverse its hysteresis loop from the point $-B_r$ to the point $B_s$ a current will be induced in the read out line 16. If, on the other hand, such a core were initially in its positive remanent point $+B_r$ and coincident driving currents were applied thereto, tending to drive it to positive saturation, only a very small current would be induced in the read out line 16 as the core was driven from $B_r$ to $B_s$. The amount of such current would be dependent upon the departure of the hysteresis loop of the aforesaid core from the ideal rectangular characteristic.

With a matrix of cores, particularly where a very large number of such cores is involved, it is apparent that where hysteresis loops of such cores depart to any substantial degree from the ideal rectangular form, a core when driven from positive remanence to positive saturation may produce a substantial undesired output. Furthermore, when it is considered that a long line of cores may receive half the required magnetic field H for switching, any substantial departure from ideal hysteresis characteristics will result in undesired outputs from the cores as many of them are driven from the point $-B_r$ to beyond the knee of the hysteresis loop. Even where this does not take place it is clear that any substantial departure from the desired rectangularity of the hysteresis loop will result in undesired outputs. The cumulative effect of a large number of cores may result in outputs from the output line 16 when in fact no output should appear. Such an undesired output may be considered as a noise output and may be compared in magnitude with a desired signal output which occurs when a true switching takes place of a selected core. It is evident that a desirable criterion of performance of a matrix core storage device will be a large signal to noise ratio. The larger the signal to noise ratio the less difficulty will be experienced in providing suitable detecting circuits.

It has been determined that by heating the cores constituting a storage matrix the signal to noise ratio can be maintained at a satisfactory level while requiring smaller driving currents. In other words, for a constant driving current, the signal to noise ratio can be increased by elevating the temperature at which the cores operate. It has also been found that while for a substantial increase in temperature of the cores some diminution of signal to noise ratio occurs, nevertheless, driving current can be very substantially decreased.

FIGURES 3*a* and 3*b* are graphical representations of test results obtained with a ferrite core found to be useful in storage matrices of the type contemplated by the invention. In FIGURE 3*a* a curve is shown depicting a signal to noise ratio obtainable from a specimen core as a function of temperature. FIGURE 3*b* shows optimum current plotted as a function of temperature. Optimum current is defined as that current which results in the largest signal to noise ratio. It is shown that for different operating temperatures the drive current for the desired signal to noise ratio will generally be lowered as the operating temperature of the core increases. From the actual test results shown in FIGURES 3*a* and 3*b* it has been determined that a desirable operating temperature is 125° Fahrenheit.

In FIGURE 4 is shown a preferred embodiment of a physical means for realizing the invention. In FIGURE 4 there is shown a cabinet 20 which is completely closed and within which is mounted a stack of parallel ferrite core storage matrices 22. Such an array may constitute a complete memory such as may be found, for example, in an electronic digital computer. Each of the matrices comprising the stack will be provided with the necessary switching and output lines and such lines may be led to the required switching and driving devices as well as detecting means. Particular circuit details of these latter form no part of the present invention and so no further details have been shown relating thereto. For the present purposes it is sufficient to note that the storage cores used in the matrices forming the stack are formed from one among the class of materials known as ferrites. In a particular embodiment of the invention the actual material used was a ferrite comprising 20% MnO, 40% MgO and 40% $Fe_2O_3$ expressed as mol percentages. Within the cabinet 20 is mounted a heating device 24. As shown in the embodiment of FIGURE 4 this heating device may comprise an electric resistance heater. It should be noted that the invention is not intended to be restricted to any particular form of heating device. Thus, it is possible for a further embodiment to be provided with means whereby heated air could be piped into the cabinet 20. Further the temperature could be maintained at the desired elevated value by means of a liquid heating element surrounding and in contact with the ferrite cores rather than simply having the cores surrounded by air. Still further possibilities can be envisioned and might include radiant heating means.

In order to maintain the output of heating means 24 at the desired level and thereby maintain the temperature within the cabinet 20 at the aforesaid desired predetermined level thermostat 26 is shown arranged in circuit with heating element 24.

In operation the heating device 24 is connected to a power supply by way of thermostat 26. When the temperature within the cabinet 20 rises beyond the desired level as detected by the thermostat 26, heater 24 would be turned off until such time as the temperature within the cabinet 20 drops below the predetermined level whereupon the heater will once more be switched on. In the actual embodiment a preferred operating temperature for the particular core used has been found to be 125° Fahrenheit. Thus, for this embodiment the thermostat may be designed to cycle within 123° and 127° Fahrenheit.

While only one embodiment of the invention has been specifically shown, it is clear that many variations will be evident to those skilled in the art. Accordingly, the invention is to be considered as limited only to the extent of the definition set forth by the claim appended hereto.

Having thus described the invention, what is claimed is:

1. In a ferrite core storage device the improvement comprising heating means associated with said device and effective to maintain the temperature of the ferrite cores at a substantially constant predetermined level above normal atmospheric temperature.

2. In a ferrite core storage device the improvement comprising an enclosure for said device and heating means within said enclosure whereby the ambient temperature surrounding the device is maintained at a constant predetermined value substantially above the atmospheric temperature external to the enclosure.

3. A ferrite core storage device comprising a plurality of ferrite cores in a matrix storage array, drive means and output means associated with said cores, an enclosure surrounding said array and heating means within said enclosure thereby to raise the temperature of said ferrite cores above the atmospheric temperature surrounding said enclosure whereby for a given signal to noise output ratio obtainable from said cores the drive current requirement is substantially reduced.

4. A ferrite core storage device comprising a plurality of ferrite cores, drive means and output means associated with said cores, an enclosure surrounding said array, a heating means within said enclosure and thermostatic control means effective to control the output of said heating means whereby the temperature of the cores constituting the array is maintained substantially between 123° F. and 127° F.

5. In a magnetic device employing ferrite cores and having input means and output means, the method of increasing the output signal to noise ratio for a predetermined input current which comprises heating the ferrite cores to a temperature between 123° F. and 127° F.

6. In combination, a box-like unit which may be completely closed, a magnetic core array, each core in said array operable to be driven by the application of electromagnetic forces thereto, means for varying the temperature of said cores within said unit, means for regulating said temperature varying means, and means for transmitting the temperature throughout the confines of said unit.

7. In combination, a box-like unit which may be completely closed, a plurality of magnetic core arrays each core in each of said arrays operable to be driven by the application of electromagnetic forces thereto, means for applying electromagnetic forces to said cores, means for varying the temperature of said cores within said unit in order to obtain improved operating characteristics for said cores, means for regulating said temperature varying means, and means for transmitting the temperature throughout the confines of said unit.

8. In combination, a box-like unit which may be completely closed, a magnetic core array, each core in said array operable to be driven by the application of electromagnetic forces thereto, means for elevating the temperature of said cores within said unit, means for regulating said temperature at about 125° F., and means for transmitting the 125° F. temperature throughout the confines of said unit.

References Cited in the file of this patent

UNITED STATES PATENTS

| | | |
|---|---|---|
| 2,776,419 | Rajchman et al. | Jan. 1, 1957 |
| 2,989,733 | Drougard | June 20, 1961 |

FOREIGN PATENTS

| | | |
|---|---|---|
| 820,645 | Great Britain | Sept. 23, 1959 |